No. 677,080. Patented June 25, 1901.
F. HEINTZ.
BICYCLE SUPPORT.
(Application filed Oct. 9, 1900.)
(No Model.)
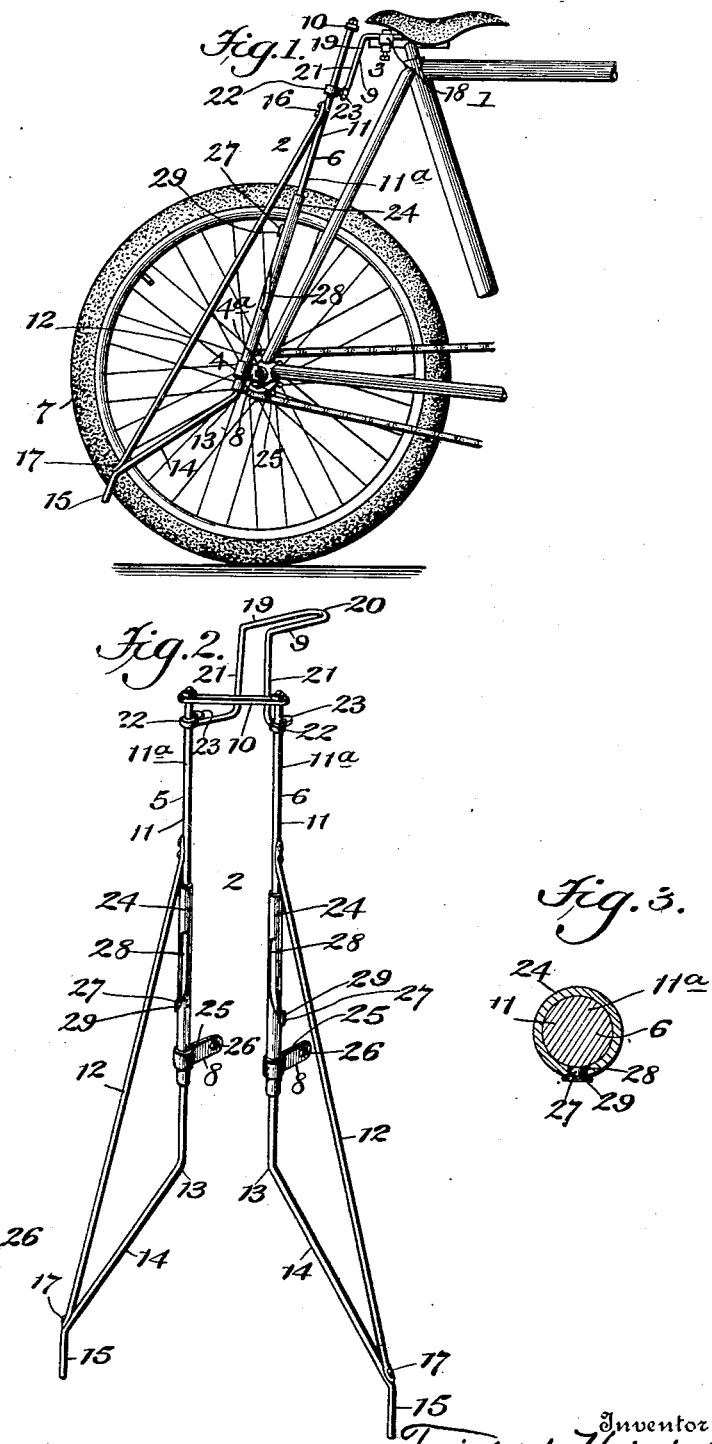

UNITED STATES PATENT OFFICE.

FRIEDRICH HEINTZ, OF NEW YORK, N. Y.

BICYCLE-SUPPORT.

SPECIFICATION forming part of Letters Patent No. 677,080, dated June 25, 1901.

Application filed October 9, 1900. Serial No. 32,471. (No model.)

*To all whom it may concern:*

Be it known that I, FRIEDRICH HEINTZ, a citizen of the United States, residing at New York, in the county and State of New York, have invented certain new and useful Improvements in Bicycle-Supports, of which the following is a specification.

This invention relates to portable bicycle-supports; and it has for its object to provide a simple, strong, and effective adjustable support which is carried by the bicycle and may be readily adjusted into extended or operative position or into retracted or inoperative position.

In the drawings, Figure 1 is a side elevation of the rear portion of a bicycle provided with the improved support constituting the present invention, the support being shown in retracted or inoperative position. Fig. 2 is a perspective view of the support in detached and extreme extended or operative position. Fig. 3 is a detail sectional view of a portion of the support. Fig. 4 is a detail perspective view of a bracket constituting a part of the support in detached position.

Corresponding parts in all the figures are denoted by the same numerals of reference.

Referring to the drawings, 1 designates a bicycle of ordinary "safety" type, and 2 designates my improved support, which is preferably connected with the bicycle at the seat-support and rear axle, as at 3 and 4. The support 2 comprises two main side or brace members 5 and 6, preferably arranged at either side of the rear wheel 7 of the bicycle and carried by brackets 8, detachably secured to the rear axle, as at 4, and a bracket 9, detachably secured to the seat-support, as at 3. The members 5 and 6 are operatively connected at their upper ends by a cross-piece or handle device 10, whereby the members may be extended into operative position or retracted into inoperative position in the manner hereinafter described.

Each of the support members 5 and 6 is preferably formed of suitably bent and connected wire rods to insure lightness, and comprises a main rod 11, the major portion 11ᵃ of which operates with respect to the brackets 8 and 9, and a brace-rod 12. The main rod 11 is preferably bent at a predetermined point, as at 13, and extended, as at 14, at an obtuse angle to the major portion of the rod, terminating at its lower end in an angularly and downwardly directed toe 15. The brace-rod 12 preferably extends from a point, as at 16, in the upper portion of the major portion 11ᵃ of the rod 11 to a point, as at 17, in the lower portion of the portion 14 of the rod 11 and adjacent the upper end of the toe 15. The rod 12 thus completes, with the portions 11ᵃ and 14 of the rod 11, a triangular formation, which secures a firm braced relation between the several parts of the support member.

The members 5 and 6 are revolubly and slidably connected with the brackets 8 and 9, and the cross-piece or handle device 10 is loosely connected with the upper ends of the rods 11 of the members to allow rotation of said rods relative to the same.

The bracket 9, which is preferably detachably connected with the seat-support 3 of the bicycle by means of a clamp 18, preferably consists of a single length of bent wire rod 19, which is looped centrally, as at 20, for connection with the seat-support by means of the clamp 18. The end portions of the wire 19 are formed into downwardly, outwardly, and rearwardly extending arms 21, which preferably terminate in eyes or keepers 22, in which the portions 11ᵃ of the rods 11 of the support members are received. The keepers 22 are provided with thumbscrews 23, whereby the rods 11 and support members in entirety may be secured in adjusted position.

The brackets 8 preferably consist each, as illustrated most clearly in Fig. 5, of a metallic tube or sleeve 24, provided adjacent the lower end with a projection 25, perforated, as at 26, to allow of ready connection with the rear axle 4 and axle-nut 4ᵃ thereon. The sleeves 24 in operative position project upwardly in alinement with the eyes or keepers 22, and the portions 11ᵃ of the rods 11 of the support members project through the sleeves 24 and have a vertical or axial and revoluble play therein and in the keepers 22. The rods 12 connect with the rods 11, as at 16, as above stated, above the sleeves 24.

In their normal or retracted position, as illustrated in Fig. 1, the support members 5 and 6 lie in planes substantially parallel with the circumferential plane of the rear wheel 7, and thus present the least obstruction in the movement of the bicycle. The members 5 and 6 are also in the raised position when not in operation and are so maintained by the thumb-screws 23, which are tightened down onto the rods 11. When, however, it is desired to employ the support to sustain the bicycle in upright position, the handle device 10 is grasped and the members 5 and 6 are forced downwardly and outwardly into the position shown in Fig. 2. To accomplish this combined downward and outward movement of the members, I provide each of the rods 11 in the portion 11$^a$ thereof with a laterally-extending pin 27, which projects within a spiral slot 28, formed longitudinally of the sleeve 24, each of the pins 27 being preferably provided with an enlarged head 29 exterior of the slot 28. As the rods 11 move downwardly the pins 27 are caused to rotate the rods, and the support members swing on the rods as axes and assume the laterally-projecting position illustrated in Fig. 2, in which they firmly brace and support the bicycle.

The operation and advantages of my invention will be readily understood by those skilled in the art to which it appertains. The handle device 10 is conveniently arranged with respect to the seat or saddle of the bicycle, and the rider while in riding position may reach back, grasp the handle, and force the support members downwardly and outwardly to cause the toes 15 to engage the ground and firmly brace and support the bicycle in upright position. The thumb-screws 23 for locking the support in adjusted position may also be conveniently reached and manipulated by the rider and, if desired, without dismounting.

The sleeves 24 and the bracket 9 may be readily fitted to and detached from any bicycle of standard type, and the entire device, being mainly of wire-rod construction, is light and portable.

It will be noted that in Fig. 2 the toes 15 are illustrated as projecting in position to raise the rear wheel of the bicycle bodily from the ground, and this position of parts enables convenient and thorough cleaning of the bicycle.

It will be further noted that the entire operation of the device to adjust the parts into and out of operative position is accomplished by manipulation of the handle device 10.

I do not desire to be understood as limiting myself to the details of construction and arrangement as herein described and indicated, as it is manifest that variations and modifications may be made in the features of construction and arrangement in the adaptation of the device to various conditions of use without departing from the spirit and scope of my invention and improvement. I therefore reserve the right to all such variation and modification as properly falls within the scope of my invention and the terms of the following claim.

Having thus described my invention, I claim and desire to secure by Letters Patent—

The combination, with a bicycle; of a bracket connected with the same at the seat-support and comprising two spaced arms, other brackets connected with the bicycle at either side of the rear wheel, and side or brace members slidably and revolubly supported by said brackets and arranged at either side of the rear wheel, said side or brace members being operatively connected at their upper ends by a single handle device, each of said side or brace members consisting of an angular body-rod which is bent at its lower end to form a supporting-toe and a separate brace-rod completing the triangular formation of each side or brace member and connected with the respective brace-rod at a point adjacent said toe and at a point between two of said brackets, each of said side or brace members being so operatively connected with one of said brackets that said side or brace members may be adjusted by said handle device downwardly and laterally into operative position and upwardly and inwardly into retracted position.

In testimony whereof I have signed my name in the presence of the subscribing witnesses.

FRIEDRICH HEINTZ.

Witnesses:
GEO. VAIL HUPPERTZ,
RAYMOND I. BLAKESLEE.